United States Patent [19]
Arnold et al.

[11] 3,789,586
[45] Feb. 5, 1974

[54] APPARATUS FOR REMOVING SURFACE FILMS FROM LIQUIDS

[75] Inventors: Orlan M. Arnold, Grosse Pointe Park, Mich.; Carlo A. Vancini, Stamford, Conn.

[73] Assignee: Peabody Engineering Corporation, New York, N.Y.

[22] Filed: Jan. 7, 1972

[21] Appl. No.: 216,184

[52] U.S. Cl............. 55/228, 210/527, 210/DIG. 21
[51] Int. Cl............................................. B01d 50/00
[58] Field of Search. 55/87, 89, 223, 227, 228, 230, 55/238, 239, 244, 248, 250, 257, 259; 210/169, 527, DIG. 21, 241; 261/3, 7, 8, 76, 115, 116, 117, 118, 119, DIG. 54

[56] References Cited
UNITED STATES PATENTS

| | | | |
|---|---|---|---|
| 3,581,467 | 6/1971 | Donnelly | 55/89 |
| 2,989,185 | 6/1961 | Lombardi | 210/169 X |
| 2,159,409 | 5/1939 | Tark | 210/527 |
| 3,635,342 | 1/1972 | Mourlon et al. | 210/DIG. 21 |

Primary Examiner—Samih N. Zaharna
Assistant Examiner—Robert H. Spitzer
Attorney, Agent, or Firm—Nathaniel L. Leek

[57] ABSTRACT

In a reservoir carrying a liquid, a funnel disposed below the surface and movable across the reservoir and a liquid jet disposed to cause the surface film or foam to flow into the funnel from which it is discharged to the outside.

6 Claims, 5 Drawing Figures

PATENTED FEB 5 1974

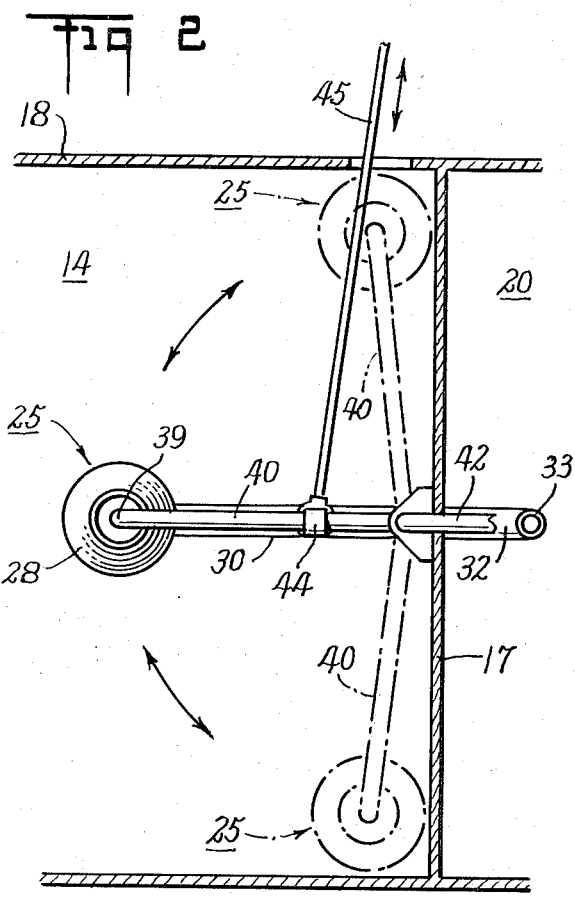
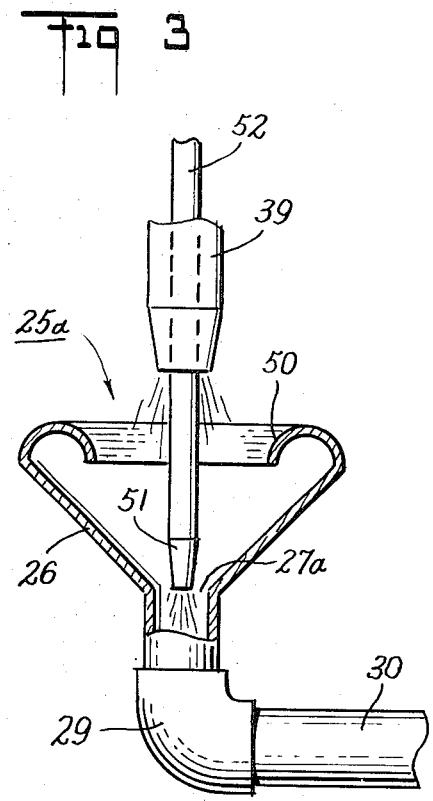
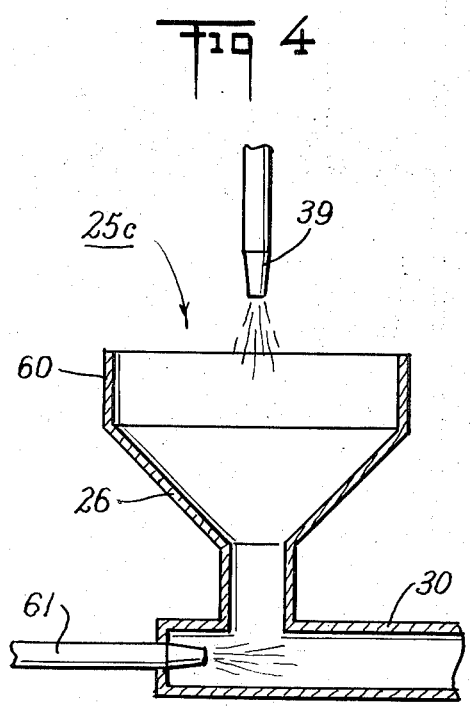
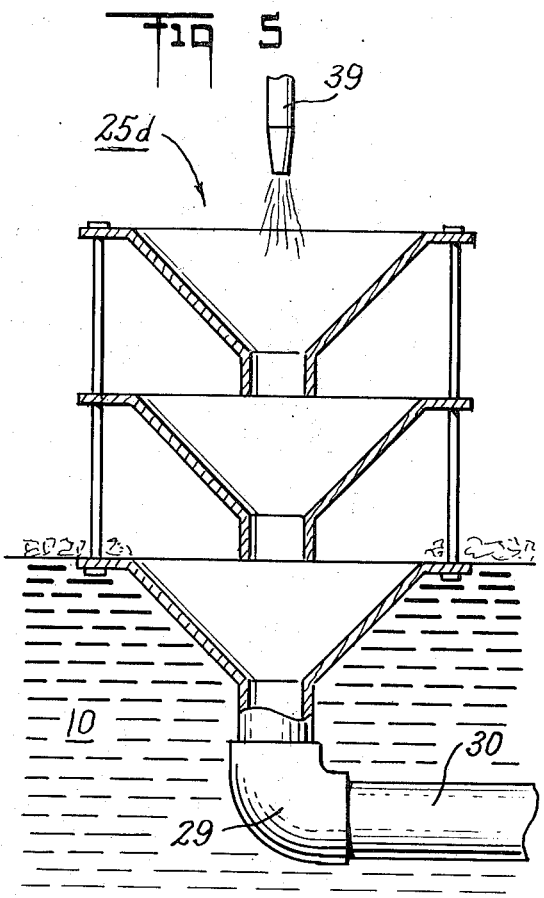

APPARATUS FOR REMOVING SURFACE FILMS FROM LIQUIDS

This invention relates to apparatus for the removal of surface films or foam from liquids in a reservoir and has for an object to provide apparatus of the above type having novel and improved features of construction and characteristics of operation.

Another object is to provide such apparatus which is adapted for use with a gas cleaning system.

Another object is to provide such apparatus which is suited for commercial operations.

Various other objects and advantages will be apparent as the nature of the invention is more fully disclosed.

A feature of the invention is the provision of one or more funnels which are mounted below the liquid level in a reservoir and is adapted to be shifted across the width of the reservoir.

A liquid jet is disposed to cause the liquid or film on the surface to flow into the funnel and to be discharged therefrom into a discharge zone out of the path of the gases being treated.

The nature of the invention will be better understood from the following description, taken in connection with the accompanying drawing in which certain specific embodiments have been set forth for purposes of illustration.

In the drawing:

FIG. 2 is a partial horizontal section taken on the line 2—2 of FIG. 1;

FIG. 3 is a detail section through a funnel and nozzles illustrating a further embodiment of the invention; and Figs. 4 and 5 are similar partial sections showing still further embodiments.

Figure 1:
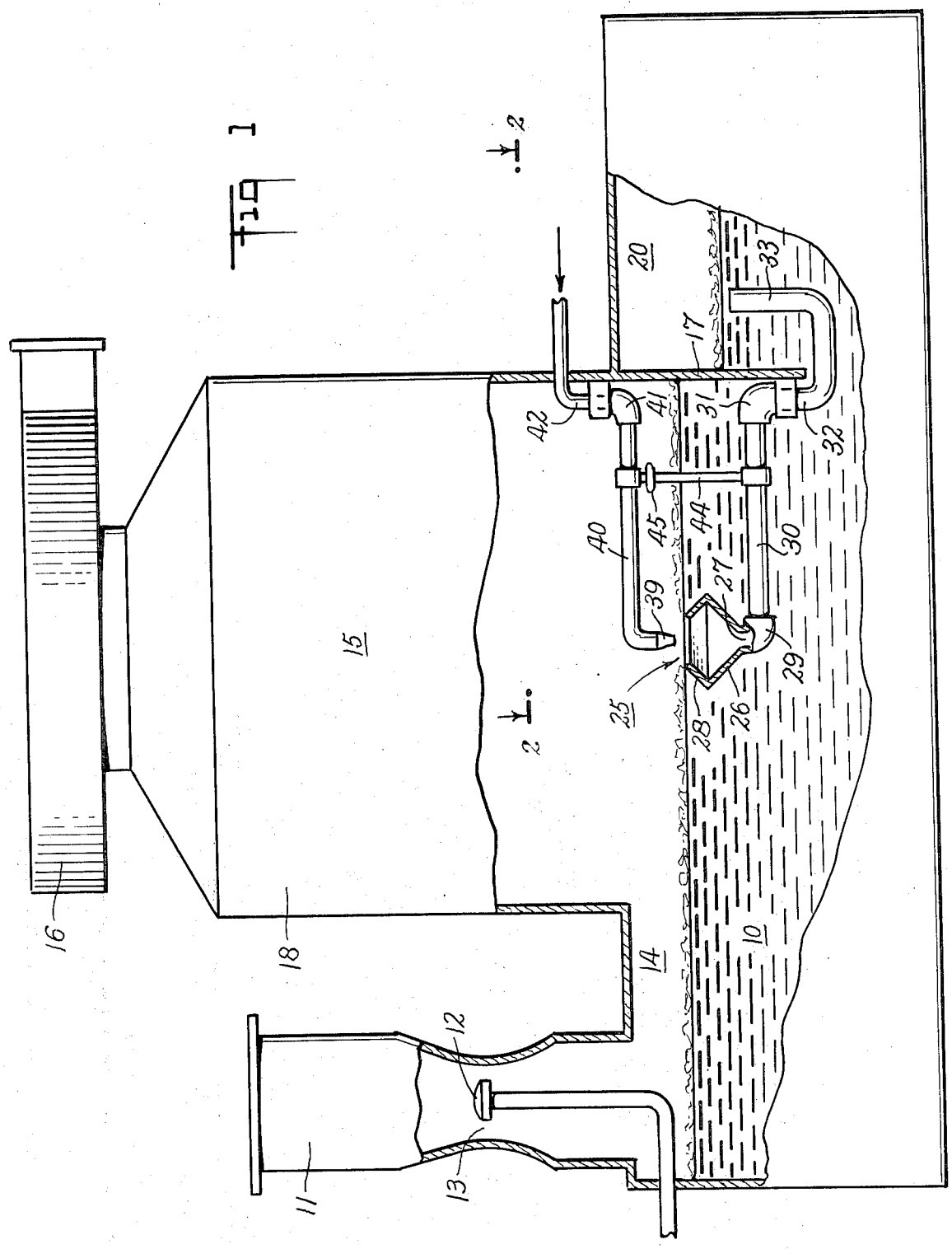
FIG. 1 is a side elevation of a gas cleaning apparatus embodying the invention, with parts in section for clarity.

Referring to the drawing more in detail, the apparatus is shown as comprising a reservoir 10 adapted to receive and collect the wash liquid from a gas washing device including an inlet duct 11 containing a spray means 12 and a suitable venturi section 13 through which the gas for washing is passed and which discharges the gas and wash liquid into the space 14 above the liquid level in the reservoir.

The washed gases pass along the space 14 into a drying zone 15 containing suitable means for removing entrained droplets from the gases and are discharged by means of a blower 16. The forward wall 17 of the housing 18 forming the drying zone extends below the liquid level in the reservoir so as to confine the gases. The reservoir extends beyond the wall 17 to a discharge zone 20 in which the settled sludge is removed by suitable means such as a conveyor not shown.

The portion of the apparatus thus far described is conventional and only so much thereof has been shown as is necessary for an understanding of the invention. In accordance with the present invention a funnel 25 having a flared wall 26 and a discharge opening 27 is disposed with its open inwardly flared lip 28 below the level of the liquid in the reservoir 10. The discharge end of the funnel is attached to an elbow 29 of a horizontal pipe 30 which supports and carries the funnel and receives the liquid which passes therethrough. The pipe 30 is pivotally mounted by means of an elbow 31 on a vertical pipe 32 attached to the wall 17 or to other fixed support means. The pipe 32 communicates with a discharge pipe 33 which has a discharge opening in the discharge zone 20 of the reservoir and preferably near the surface of the liquid therein so that the foam or other floating material which passes through the funnel 25 is transferred to the surface of the liquid in the discharge portion 20 of the reservoir 10. The pipe 33 may, however, be positioned to discharge directly into a final removal zone outside of the reservoir.

A liquid nozzle 39 is disposed centrally of and above the funnel 25 and is carried by a pipe 40 pivoted by an elbow 41 on a vertical liquid supply pipe 42 mounted in alignment with the vertical pipe 32 and connected to a source of liquid, not shown. The pipes 30 and 40 are attached to a bracket 44 which is adapted to be actuated by an arm 45, FIG. 2, to cause the funnel 25 and nozzle 39 to swing in unison about the axes of the pipes 32 and 42. The arm 45 may be actuated by suitable means, not shown, such as a motor or hydraulic cylinder so as to cause the funnel and nozzle to swing in unison across the reservoir 10.

In operation a jet of liquid is supplied to the nozzle 39 and produces a spray which is directed downwardly into the funnel 25 and onto any material floating on the surface of the liquid in the reservoir. This causes the floating film which may include foam, oil, or small floating particles, to flow downwardly into the funnel and out through the discharge pipe 33 into the discharge zone 20 of the reservoir or to any other outside discharge point. The surface contaminants are thus removed from contact with the gases in the drying zone 15 and are prevented from accumulating in the apparatus.

In the embodiment of FIG. 3 the parts which are similar to those in FIGS. 1 and 2 have been given the same reference numbers. The funnel 25a in FIG. 3 is shown having an inturned upper lip 50 to prevent material from being discharged over the rim and is provided with a second nozzle 51 which is carried on a pipe 52 concentric with the nozzle 39 and supplied with liquid for forming a jet or spray from any suitable source which may be the same as that supplying the nozzle 39 or may be independent thereof.

The nozzle 51 is preferably disposed within and near the outlet opening 27a of the funnel 25a so as to induce a flow of liquid from the funnel into the outlet pipe 30 and to create a suction which assists in drawing the liquid film from the surface of the liquid in the reservoir 10.

Fig. 4 shows another means for inducing such flow of liquid. In this Figure, as in FIg. 3, parts similar to those above described are given the same reference numbers. The funnel 25c in FIG. 4 includes a vertical rim portion 60 and includes a nozzle 61 disposed to introduce a jet of liquid directly into the end of pipe 30 for thereby acting similar to an aspirator for inducing liquid flow through the discharge pipe.

As an alternate means it is obvious that the discharge pipe 30 may be connected to a suction pump or other flow inducing means which may discharge directly to the final discharge duct.

It is to be understood that the funnel 25 may be traversed continuously across the reservoir or may be shifted to different positions according to the material to be removed. Also a plurality of such funnels may be disposed across the reservoir.

FIG. 5 illustrates an apparatus similar to FIG. 1, but including a plurality of funnels 25d which are stacked vertically in spaced relationship. In the embodiment shown, the lower funnel is below the liquid level and the two upper funnels are above the liquid level. These funnels, however, become operative in the event of a rise in the liquid level. With this construction at least one of the funnels is disposed below the surface of the liquid regardless of variations in the liquid level. The arrangement is otherwise the same as in FIG. 1, including the nozzle 39 which is positioned to induce a liquid flow into the stacked funnels and outwardly through the discharge openings into the discharge pipe 30. Of course provision may be made for adjusting the height of the funnels in the embodiments illustrated in FIGS. 2 to 4 so as to accommodate changes in liquid level in the reservoir.

In any of the above embodiments the floating film or foam is removed directly from the liquid in the drying zone and is prevented from otherwise interfering with the operation of the apparatus. The film removal equipment is shown as used in a gas washing apparatus, but may be applied to other uses where a floating film is to be removed from the surface of a liquid.

What is claimed is:

1. In a gas cleaning apparatus including a reservoir carrying a wash liquid, a layer of floatable material floating on said wash liquid and a drying chamber positioned to receive washed gases, a funnel immersed in said reservoir having an upwardly facing rim disposed in said reservoir below the level of floatable material, means inducing a flow of liquid into said funnel including a nozzle disposed to direct a spray above said funnel, a pipe connected to the lower end of the funnel to receive the liquid from said funnel and to discharge the same beyond said drying chamber, wherein said funnel and nozzle are permanently mounted for predetermined, transverse angular movement in unison across said reservoir.

2. Apparatus as set forth in claim 1 wherein the nozzle is disposed to direct a spray of liquid onto the surface of said liquid above said funnel.

3. Apparatus as set forth in claim 1 including a second nozzle disposed in said funnel to direct a jet of liquid toward said pipe.

4. Apparatus as set forth in claim 1 in which said funnel has an inwardly directed rim portion.

5. Apparatus as set forth in claim 1 in which a second nozzle is disposed in said pipe to direct a liquid jet into said pipe to thereby induce the flow of material therethrough.

6. Apparatus as set forth in claim 1 including a plurality of funnels which are stacked in spaced relationship to provide openings at different elevations.

* * * * *